(12) United States Patent
Millner et al.

(10) Patent No.: US 9,181,595 B2
(45) Date of Patent: Nov. 10, 2015

(54) REFORMER GAS-BASED REDUCING METHOD WITH REDUCED $NO_x$ EMISSION

(75) Inventors: Robert Millner, Loosdorf (AT);
Guenter Peer, Gunskirchen (AT)

(73) Assignee: SIEMENS VAI METALS TECHNOLOGIES GMBH (AT)

( * ) Notice: Subject to any disclaimer, the term of this patent is extended or adjusted under 35 U.S.C. 154(b) by 637 days.

(21) Appl. No.: 13/388,141

(22) PCT Filed: Jul. 15, 2010

(86) PCT No.: PCT/EP2010/060174
§ 371 (c)(1),
(2), (4) Date: Mar. 16, 2012

(87) PCT Pub. No.: WO2011/012452
PCT Pub. Date: Feb. 3, 2011

(65) Prior Publication Data
US 2012/0160062 A1    Jun. 28, 2012

(30) Foreign Application Priority Data

Jul. 31, 2009    (AT) ................. A 1215/2009

(51) Int. Cl.
*C21B 13/02* (2006.01)
*C21B 13/14* (2006.01)
*C01B 3/38* (2006.01)

(52) U.S. Cl.
CPC .............. *C21B 13/143* (2013.01); *C01B 3/384* (2013.01); *C21B 13/02* (2013.01); *C01B 2203/06* (2013.01); *C01B 2203/0816* (2013.01); *C01B 2203/0827* (2013.01); *C01B 2203/148* (2013.01);*C21B2100/02* (2013.01); *C21B 2100/04* (2013.01); *C21C 2100/06* (2013.01)

(58) Field of Classification Search
USPC ...................... 75/414, 392; 266/144
See application file for complete search history.

(56) References Cited

U.S. PATENT DOCUMENTS

| 3,764,123 A | 10/1973 | Beggs et al. ................... 266/29 |
| 3,868,211 A | 2/1975 | Haye et al. ...................... 431/10 |
| 4,880,459 A | 11/1989 | Coyne, Jr. ........................ 75/35 |

(Continued)

FOREIGN PATENT DOCUMENTS

| CN | 1492982 A | 4/2004 | ................ F23C 6/04 |
| DE | 3843830 A1 | 7/1990 | ............. B01D 53/56 |

(Continued)

OTHER PUBLICATIONS

International PCT Search Report and Written Opinion, PCT/EP2010/060174, 13 pages, Dec. 5, 2011.

(Continued)

*Primary Examiner* — Kaj K Olsen
*Assistant Examiner* — Alexander Polyansky
(74) *Attorney, Agent, or Firm* — Ostrolenk Faber LLP

(57) ABSTRACT

In a process and apparatus for the reduction of metal oxides (3) to form metalized material by contact with hot reducing gas, which is produced at least partially by catalytic reformation of a mixture of a gas containing carbon dioxide ($CO_2$) and/or steam ($H_2O$) with gaseous hydrocarbons, the heat for the endothermal reformation processes which take place during the reformation is provided at least partially by the combustion of a fuel gas.

9 Claims, 1 Drawing Sheet

(56) References Cited

U.S. PATENT DOCUMENTS

| | | | |
|---|---|---|---|
| 5,387,274 A | 2/1995 | Dam et al. | 75/495 |
| 5,542,963 A | 8/1996 | Sherwood | 75/382 |
| 5,858,057 A | 1/1999 | Celada-Gonzalez et al. | 75/490 |
| 6,524,356 B2 | 2/2003 | Fournier | 48/198.1 |
| 6,957,955 B2 | 10/2005 | Kobayashi et al. | 431/10 |
| 2008/0210055 A1* | 9/2008 | Orth et al. | 75/444 |
| 2012/0160062 A1 | 6/2012 | Millner et al. | 75/414 |

FOREIGN PATENT DOCUMENTS

| | | | |
|---|---|---|---|
| GB | 1055819 | 1/1967 | C10G 13/30 |
| RU | 2195425 C2 | 12/2002 | |
| WO | 99/11571 A1 | 9/1999 | C01B 3/24 |
| WO | 2006/135984 A1 | 12/2006 | C21B 11/02 |
| WO | 2009/065843 A2 | 5/2009 | C21B 13/00 |
| WO | 2011/012452 A1 | 2/2011 | C21B 13/02 |

OTHER PUBLICATIONS

Buhre, B.J.P., et al., "Oxy-fuel Combustion Technology for Coal-Fired Power Generation", Progress in Energy and Combustion Science, www.sciencedirect.com, pp. 283-307, Jul. 30, 2005.

Russian Federation Decision on Grant, dated Jun. 30, 2014, issued in corresponding Russian Patent Application No. 2012107293/02(011080). English Translation. Total 12 pages.

* cited by examiner

REFORMER GAS-BASED REDUCING METHOD WITH REDUCED $NO_x$ EMISSION

CROSS-REFERENCE TO RELATED APPLICATIONS

This application is a U.S. National Stage Application of International Application No. PCT/EP2010/060174 filed Jul. 15, 2010, which designates the United States of America, and claims priority to Austrian Patent No. A1215/2009 filed Jul. 31, 2009, the contents of which are hereby incorporated by reference in their entirety.

TECHNICAL FIELD

The present invention relates to a process for the reduction of metal oxides to form metalized material by contact with hot reducing gas, which is produced at least partially by catalytic reformation of a mixture of
   a gas containing carbon dioxide ($CO_2$) and/or steam ($H_2O$)
      with
   gaseous hydrocarbons,
wherein the heat for the endothermal reformation processes which take place during the reformation is provided at least partially by the combustion of a fuel gas. Furthermore, the present invention relates to an apparatus for carrying out the process.

BACKGROUND

By way of example, FIG. 1 of WO2006135984 describes a process for the reduction of metal oxides to form metalized material by contact with hot reducing gas, which is at least partially produced by catalytic reformation of natural gas wherein the heat for the endothermal reformation processes which take place during the reformation is provided at least partially by the combustion of a fuel gas. Owing to statutory regulations, it is desirable for it to be possible to efficiently separate $CO_2$ from the off-gases produced during the process, before they are released into the environment. In the case of a process as shown in WO2006135984, the fuel gas for the reformer is combusted with air as the oxygen source, for which reason the combustion off-gas contains a large quantity of nitrogen. Correspondingly, downstream plants for removing $CO_2$ from the combustion off-gas have to have a correspondingly large design. Additionally, only chemical absorption processes which have a large design and a high energy consumption are suitable for removing $CO_2$ from the combustion off-gas which is at low pressure.

Furthermore, if conventional burners are used high $NO_x$ contents are present in the combustion off-gas owing to the nitrogen. Owing to ever more stringent environmental regulations, downstream deNO$_x$ing systems, in particular the process for the selective catalytic reduction of nitrogen oxides (SCR), are thus almost always required. Although high $NO_x$ contents in the combustion off-gas are prevented, on the other hand, when low-$NO_x$ burners are used, the flame pattern of such burners is disadvantageous for use in the reformer.

A further disadvantage of the use of air as the oxygen source arises from the fact that heat is transferred in the reformer, and possibly in recuperators present in the combustion off-gas lines, only to a relatively small extent by radiation and predominantly by convection owing to the high nitrogen content, convection bringing about a much less efficient transfer of heat than radiation.

SUMMARY

According to various embodiments, a process and also an apparatus for carrying out the process can be provided, with which process the disadvantages mentioned can be overcome.

According to an embodiment, in a process for the reduction of metal oxides to form metalized material by contact with hot reducing gas, wherein the reducing gas is produced at least partially by catalytic reformation of a mixture of—a gas containing carbon dioxide ($CO_2$) and/or steam with—gaseous hydrocarbons, the heat for the endothermal reformation processes which take place during the reformation is provided at least partially by the combustion of a fuel gas, and the combustion off-gas produced in the process is drawn off, wherein it is cooled and water is removed from it, characterized in that the oxygen required for the combustion of the fuel gas is supplied to the fuel gas with a gas mixture produced from a partial quantity of the combustion off-gas, which has been cooled and from which water has been removed, and pure oxygen.

According to a further embodiment, the gas containing carbon dioxide and/or steam can be top gas from the process for the reduction of metal oxides. According to a further embodiment, the gas containing carbon dioxide and/or steam can be export gas from a smelting reduction process or syngas from a coal gasification process. According to a further embodiment, $CO_2$ can be produced at least from a partial quantity of the combustion off-gas which is not used for the formation of the gas mixture. According to a further embodiment, the gas mixture can be heated before it is supplied to the fuel gas.

According to another embodiment, an apparatus for carrying out the process as described above, may comprise a reduction unit for the reduction of metal oxides to form metalized material, a reformer for carrying out catalytic reformation of a mixture of—a gas containing carbon dioxide and/or steam with—gaseous hydrocarbons, wherein the reformer is provided with a mixture supply line for supplying the mixture, and wherein the reformer is provided with burners for providing heat by the combustion of fuel gas, a reducing gas supply line for hot reducing gas from the reformer into the reduction unit, a discharge line for discharging top gas from the reduction unit, and a drawing-off line for drawing off combustion off-gas from the reformer, which line comprises at least one apparatus for cooling the combustion off-gas and for removing water from the combustion off-gas, wherein the burners are provided with an apparatus for supplying fuel gas and with an apparatus for supplying a gas mixture produced from a partial quantity of the combustion off-gas, obtained after passing through the at least one apparatus for cooling and for removing water, and pure oxygen.

According to a further embodiment of the apparatus, the apparatus for supplying the gas mixture containing a partial quantity of the combustion gas and pure oxygen may comprise a gas mixture line which branches off from the drawing-off line and into which an oxygen supply line issues. According to a further embodiment of the apparatus, an apparatus for producing $CO_2$ from a flow of combustion off-gas can be present in the drawing-off line. According to a further embodiment of the apparatus, the apparatus for supplying a gas mixture produced from a partial quantity of the combustion off-gas and pure oxygen can be provided with an apparatus for heating the gas mixture. According to a further embodiment of the apparatus, the apparatus for heating the gas mixture can be recuperators for the transfer of heat from combustion off-gas to the gas mixture. According to a further embodiment of the apparatus, the reduction unit can be a fluidized bed cascade. According to a further embodiment of the apparatus, the reduction unit can be a fixed-bed reduction shaft.

BRIEF DESCRIPTION OF THE DRAWINGS

In the text which follows, various embodiments are explained in more detail with reference to schematic figures.

DETAILED DESCRIPTION

Figure 1:
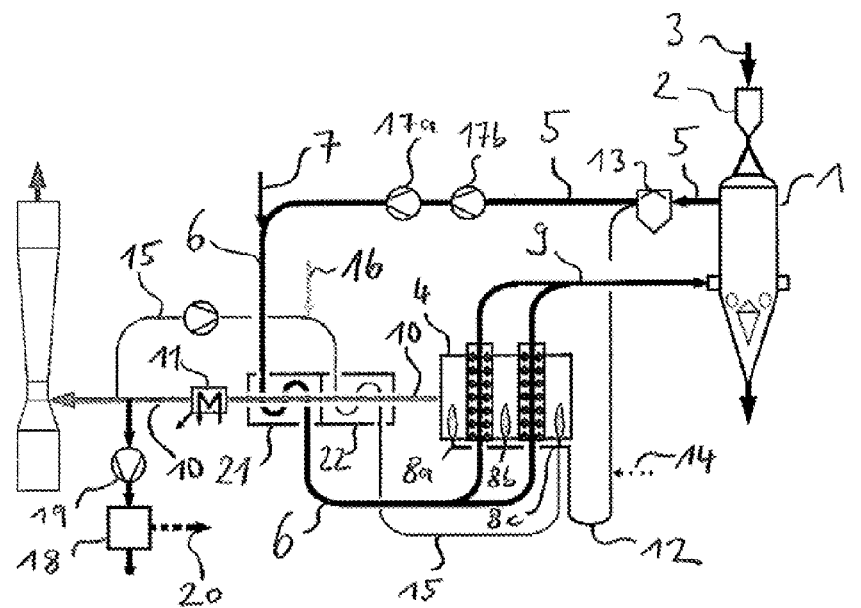
FIG. 1 shows an apparatus according to an embodiment, in which the gas containing carbon dioxide ($CO_2$) and/or steam ($H_2O$) is top gas.

As mentioned above, according to various embodiments, in a process for the reduction of metal oxides to form metalized material by contact with hot reducing gas, wherein the reducing gas is produced at least partially by catalytic reformation of a mixture of a gas containing carbon dioxide ($CO_2$) and/or steam ($H_2O$) with gaseous hydrocarbons, the heat for the endothermal reformation processes which take place during the reformation is provided at least partially by the combustion of a fuel gas, and the combustion off-gas produced in the process is drawn off, wherein it is cooled and water is removed from it, wherein the oxygen required for the combustion of the fuel gas is supplied to the fuel gas with a gas mixture produced from a partial quantity of the combustion off-gas, which has been cooled and from which water has been removed, and pure oxygen.

The removal of water can be partial or complete; at least partial removal of water should take place.

The metal oxides are preferably iron oxides. However, according to the Richardson-Jeffes diagram, nickel, copper, lead and cobalt can furthermore also be reduced, for example.

The reducing gas is produced at least partially by catalytic reformation of a mixture of a gas containing carbon dioxide $CO_2$ and/or steam $H_2O$ with gaseous hydrocarbons.

This reformation takes place by at least partial conversion of the gaseous hydrocarbons with $H_2O$ and $CO_2$ to form hydrogen ($H_2$) and carbon monoxide (CO). The substances $H_2O$ and/or $CO_2$ required for the reformation can be added to the mixture for reformation in each case individually or together, and/or the $H_2O$ and/or $CO_2$ present in the gas containing carbon dioxide $CO_2$ and/or steam $H_2O$ is used. It is preferable to add at least $H_2O$—as steam—to the mixture.

Gaseous hydrocarbons are to be understood as meaning, for example, natural gas, methane, propane, syngas from coal gasification or coke furnace gas. The term "gaseous hydrocarbons" includes both the possibility that only one compound, for example pure propane, is present, and also the possibility that a mixture of a plurality of compounds is present, for example a mixture of propane and methane.

The gas containing carbon dioxide $CO_2$ and/or steam $H_2O$ is, for example, top gas from the process according to various embodiments for the reduction of metal oxides. In this case, top gas is to be understood as meaning the gas which is discharged from the reduction unit in which the metal oxides are reduced to form metalized material. Before the reformation, the top gas may also be cleaned, for example by the separation of dust and/or water carried along.

The gas containing carbon dioxide $CO_2$ and/or steam $H_2O$ can also be, for example, export gas from a different process for the reduction of metal oxides, for example a smelting reduction process, or syngas from a coal gasification process, for example a Lurgi fixed-bed gasifier or Siemens entrained-flow gasifier.

With preference, the gas can be top gas from the process according to various embodiments for the reduction of metal oxides.

Table 1 shows a typical composition of top gas from a direct reduction process:

TABLE 1

| Typical gas composition of DR top gas | |
|---|---|
| | Top gas composition after gas cleaning |
| CO [% by volume] | 20 - 25 |
| $CO_2$ [% by volume] | 15 - 20 |
| $H_2$ [% by volume] | 40 - 46 |
| $H_2O$ [% by volume] | 0 - 18 |
| $CH_4$ [% by volume] | 2 - 4 |
| $N_2$ [% by volume] | 1 - 2 |

In the gas containing carbon dioxide $CO_2$ and/or steam $H_2O$, the lower limit for the carbon dioxide $CO_2$ content is 0% by volume, preferably 5% by volume, particularly preferably 15% by volume, and the upper limit for the carbon dioxide $CO_2$ content is 25% by volume, preferably 30% by volume, particularly preferably 40% by volume.

In the gas containing carbon dioxide $CO_2$ and/or steam $H_2O$, the lower limit for the steam $H_2O$ content is 0% by volume, preferably 10% by volume, and the upper limit for the steam $H_2O$ content is 20% by volume, preferably 55% by volume.

The catalytic reformation produces a reducing gas which contains principally $H_2$ and CO as reducing constituents. It is known that such reformation involves an endothermal reaction, and for this reason heat is supplied to the reformer, for example by the combustion of fuel gas with oxygen, in burners associated with the reformer.

According to various embodiments, the oxygen required for this combustion of the fuel gas is supplied to the fuel gas with a gas mixture produced from a partial quantity of the combustion off-gas, which has been cooled and from which water has largely been removed, and pure oxygen. The gas mixture is preferably composed of at least 10% by volume, preferably at least 20% by volume, up to 25% by volume, preferably up to 30% by volume pure $O_2$, and at least 70% by volume, preferably at least 75% by volume, up to 80% by volume, preferably up to 90% by volume combustion off-gas.

In this context, pure oxygen is to be understood as meaning a gas which predominantly consists of oxygen, preferably having an oxygen content of more than 90% by volume, particularly preferably of more than 95% by volume; in this case, the remainder to 100% by volume consists primarily of nitrogen and also other air constituents such as argon. By way of example, this is relevant because the requirements of DYNAMIS—a project carried out by the European Commission relating to the topic "Capture and storage of $CO_2$, associated with cleaner fossil fuels"—relating to the quality of a $CO_2$-rich flow stipulate>95% by volume $CO_2$ and for all incondensable gases—for example $N_2$, Ar, $H_2$-<4% by volume. This can be achieved for $CO_2$-rich gas flows which are produced during processes according to various embodiments and originate from the combustion off-gas only with high $O_2$ purities during the combustion of the fuel gas.

The higher the oxygen content in the pure oxygen, the higher the $CO_2$ content in the combustion off-gas, relative to the nitrogen content, and the lower the content of incondensable gases in the combustion off-gas.

The combustion off-gas of the process according to various embodiments, which has been cooled and from which water has been removed, consists predominantly of $CO_2$. The supply according to various embodiments of the oxygen required for the combustion with the gas mixture according to various embodiments has the advantage that the flame temperature can be appropriately set by virtue of the selected mixture ratio of the $CO_2$-containing combustion off-gas, which has been cooled and from which water has largely been removed, and the pure oxygen.

Before the gas mixture is supplied to the burners, it is preheated, to be precise preferably by heat exchange with the combustion off-gas. The preheating can make the process more economical as a result of a lower overall energy consumption, because the heat of the combustion off-gas is thereby recycled back into the reduction process.

Compared to the use of air as oxygen donor, significantly less or negligibly small amounts of nitrogen are fed to the burners in the procedure according to various embodiments. Accordingly, the combustion off-gas also only contains small amounts of, or no, $NO_x$ emissions, and for this reason complex $deNO_x$ apparatuses can be dispensed with. Since the combustion off-gas principally contains the good emitter $CO_2$ instead of nitrogen, heat transfers proceed much more strongly by radiation, instead of by less efficient convection by comparison.

The partial quantity of the combustion off-gas which is not used for the formation of the gas mixture for the burners is released into the environment.

$CO_2$ is advantageously separated at least from this partial quantity of the combustion off-gas, before the latter is released into the environment.

The high $CO_2$ content of the combustion off-gas in the procedure according to various embodiments makes it possible to produce $CO_2$ from the combustion off-gas in a more economical manner than in previous procedures, in which the $CO_2$ content of the combustion off-gas is much lower.

By way of example, the separated $CO_2$ can be liquefied and sequestered, and this results in a reduction in the $CO_2$ emissions of the process for the reduction of metal oxides.

In the process according to various embodiments, the fuel gas contains at least one gas from the group consisting of
top gas produced during the reduction of metal oxides to form metalized material,
gaseous hydrocarbons, for example natural gas, methane, propane, syngas from coal gasification, coke furnace gas.

According to one embodiment, the fuel gas consists of at least one gas from this group.

According to other embodiments, an apparatus for carrying out the process, may have a reduction unit for the reduction of metal oxides to form metalized material, have a reformer for carrying out catalytic reformation of a mixture of
a gas containing carbon dioxide ($CO_2$) and steam ($H_2O$) with
gaseous hydrocarbons,
wherein the reformer is provided with a mixture supply line for supplying the mixture, and wherein the reformer is provided with burners for providing heat by the combustion of fuel gas, having a reducing gas supply line for hot reducing gas from the reformer into the reduction unit, having a discharge line for discharging top gas from the reduction unit, have a drawing-off line for drawing off combustion off-gas from the reformer, which line comprises at least one apparatus for cooling the combustion off-gas and for removing water from the combustion off-gas,
wherein the burners
are provided with an apparatus for supplying fuel gas and with an apparatus for supplying a gas mixture produced from a partial quantity of the combustion off-gas, obtained after passing through the at least one apparatus for cooling and for removing water, and pure oxygen.

The cooling of the combustion off-gas and the removal of water from the combustion off-gas preferably take place within the same apparatus. Here, the removal of water is partial or complete; at least partial removal of water is preferred.

According to one embodiment, the apparatus for supplying the gas mixture produced from a partial quantity of the combustion off-gas, obtained after passing through the at least one apparatus for cooling and for removing water, and from pure oxygen comprises a gas mixture line which branches off from the drawing-off line and into which an oxygen supply line for supplying pure oxygen issues.

An apparatus for producing $CO_2$ from a flow of combustion off-gas is preferably present in the drawing-off line. The quantity of $CO_2$ released into the atmosphere of the environment can thereby be reduced; by way of example, the $CO_2$ produced can be supplied for sequestering. Here, the $CO_2$ is produced, for example, by separation from the flow of the combustion off-gas.

As seen in the direction in which the combustion off-gas flows, the apparatus for separating $CO_2$ from a flow of combustion off-gas can be arranged upstream or downstream from that point at which the gas mixture line branches off from the drawing-off line.

The apparatus for supplying a gas mixture containing a partial quantity of the combustion off-gas and pure oxygen is advantageously provided with apparatuses for heating the gas mixture, for example recuperators for heating by the combustion off-gas by means of the transfer of heat from combustion off-gas to the gas mixture.

According to one embodiment, the reduction unit is a fluidized bed cascade.

According to another embodiment, the reduction unit is a fixed-bed reduction shaft.

In FIG. 1, metal oxides 3, which are iron oxides, are added to a reduction unit 1, here a fixed-bed reduction shaft, via the oxide addition apparatus 2, for example as pellets or lump ore. The top gas, which is produced from the reducing gas in the reduction unit during the reduction of the metal oxides to form metalized material, is discharged from the reduction unit via the discharge line 5. Compressors 17a, 17b are present in the discharge line 5 in order to overcome the pressure drop in the gas-carrying plant parts. A mixture of top gas and gaseous hydrocarbons, in this case natural gas, is supplied via a mixture supply line 6 into a reformer 4 for the catalytic reformation of a mixture of top gas and gaseous hydrocarbons. Here, the natural gas is supplied via the natural gas line 7. The reformer 4 is provided with burners 8a, 8b, 8c for providing heat by the combustion of fuel gas. The hot reducing gas formed in the reformer 4 is supplied to the reduction unit 1 via the reducing gas supply line 9. The combustion off-gas is drawn off from the reformer via a drawing-off line 10 for drawing off the combustion off-gas produced during the combustion of fuel gas in the reformer. In the process, the combustion off-gas flows out of the reformer 4.

The drawing-off line 10 comprises an apparatus 11 for cooling the combustion off-gas and for removing water from the combustion off-gas. Cooling and removal of water take place in the same apparatus. The burners 8a, 8b, 8c are provided with apparatuses for supplying fuel gas, represented by the fuel gas line 12. A mixture of top gas dedusted in a top gas dedusting apparatus 13 present in the discharge line for top gas 5 and
 the gaseous hydrocarbon natural gas, which is supplied into the fuel gas line 12 via a natural gas feed line 14 shown in dashed form, is fed to the burners 8a, 8b, 8c as fuel gas through the fuel gas line 12.

The apparatus for supplying a gas mixture produced from a partial quantity of the combustion off-gas, obtained after passing through the apparatus 11 for cooling the combustion off-gas and for removing water from the combustion off-gas, and pure oxygen is used to supply this gas mixture to the burners 8a, 8b, 8c. The fuel gas is combusted with the oxygen-containing gas mixture by means of these burners, with heat being emitted. This apparatus for supplying a gas mixture is represented by the gas mixture line 15. The gas mixture line 15 branches off from the drawing-off line 10. As seen in the direction in which the gas carried in the gas mixture line 15 flows, an oxygen supply line 16 for supplying pure oxygen issues into the gas mixture line 15 downstream from the point at which the latter branches off from the drawing-off line 10.

An apparatus for producing $CO_2$ 18 from the flow of the combustion off-gas is present in one branch of the drawing-off line 10. The combustion off-gas is compressed by a compressor 19 upstream from this apparatus for producing $CO_2$ 18. A $CO_2$ discharge line 20 shown in dashed form is used to carry the separated $CO_2$-rich gas or the separated $CO_2$-rich liquid out of the apparatus for carrying out the process according to various embodiments. After this gas or liquid has been carried out, it may be sequestered, for example.

As seen in the direction in which the combustion off-gas flows, the apparatus for producing $CO_2$ 18 from the flow of the combustion off-gas is arranged downstream from that point at which the gas mixture line 15 branches off from the drawing-off line 10. $CO_2$ is produced by separation from the flow of the combustion off-gas.

Another branch of the drawing-off line 10 leads into a chimney, through which the combustion off-gas can be released into the environment, for example during downtimes of the apparatus for producing $CO_2$ 18 or of said downstream plants. The drawing-off line 10 is provided with an apparatus for heating the gas mixture, in this case a recuperator 22 for indirect heat exchange between the gas mixture in the gas mixture line and the combustion off-gas in the drawing-off line 10.

Furthermore, the drawing-off line 10 is provided with an apparatus for heating the mixture of top gas and natural gas in the supply line 6, in this case a recuperator 21 for indirect heat exchange between the mixture of top gas and natural gas in the gas mixture line and the combustion off-gas in the drawing-off line 10.

According to an embodiment of the apparatus which is not shown in the figure, a mixing chamber, which serves for improved mixing of the gas mixture, is present in the gas mixture line between that point at which the oxygen supply line for supplying pure oxygen issues into the gas mixture line and the burners.

Figure 2:
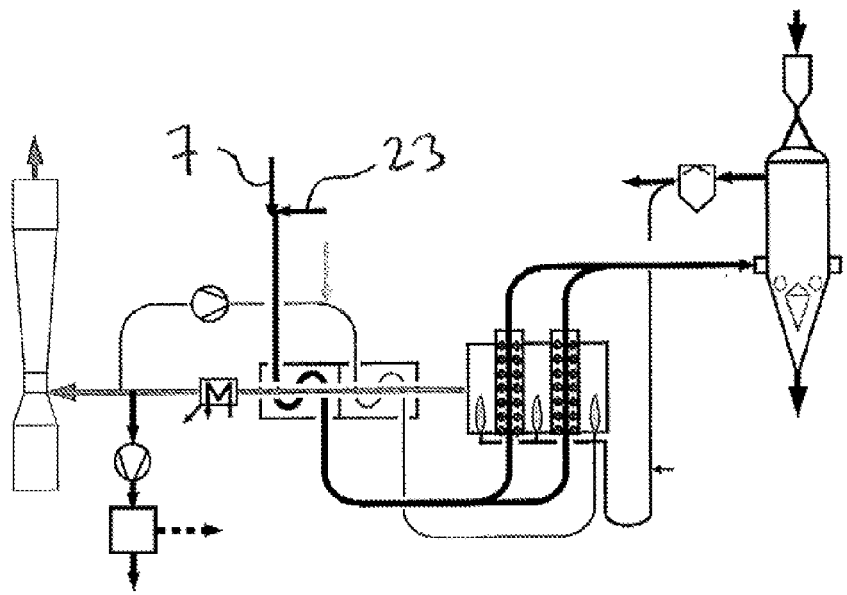
FIG. 2 shows an analogous apparatus according to an embodiment, in which the gas containing carbon dioxide ($CO_2$) and/or steam ($H_2O$) originates from a source different to that in FIG. 1.

FIG. 2 shows an apparatus analogous to FIG. 1, with the difference that syngas from a coal gasification process is used instead of top gas as the gas containing carbon dioxide ($CO_2$) and/or steam ($H_2O$). This syngas from a coal gasification process (not shown) is fed into the mixture supply line 6 via the syngas line 23 which issues into the mixture supply line 6. The mixture of syngas and natural gas thereby generated in the mixture supply line 6 is reformed in the reformer 4. For greater clarity, only the apparatus parts which appear in addition in FIG. 2 compared to FIG. 1 and the natural gas line 7 are provided with reference symbols.

LIST OF REFERENCE SYMBOLS

1 Reduction unit
2 Oxide addition apparatus
3 Metal oxides
4 Reformer
5 Discharge line
6 Mixture supply line
7 Natural gas line
8a, 8b, 8c Burners
9 Reducing gas supply line
10 Drawing-off line
11 Apparatus for cooling/removing $H_2O$
12 Fuel gas line
13 Top gas dedusting apparatus
14 Natural gas feed line
15 Gas mixture line
16 Oxygen supply line
17a, 17b Compressors
18 Apparatus for producing $CO_2$
19 Compressor
20 $CO_2$ discharge line
21 Recuperator
22 Recuperator
23 Syngas line

What is claimed is:

1. A process for the reduction of metal oxides to form metalized material by contact with hot reducing gas, wherein the reducing gas is produced at least partially by catalytic reformation, in a reformer, of a mixture of a gas containing at least one of carbon dioxide ($CO_2$) and steam with gaseous hydrocarbons, the process comprising:
 providing heat for the catalytic reformation in the reformer at least partially by combustion of a fuel gas,
 drawing off from the reformer the combustion off-gas that is produced the combustion of the fuel gas,
 cooling the combustion off-gas to remove water from the combustion off-gas and obtain an off-gas that contains less water, providing pure oxygen, producing a gas mixture from at least a partial quantity of the off-gas that contains less water and the pure oxygen, and supplying the gas mixture to the reformer for combustion to provide heat for the catalytic reformation.

2. The process according to claim 1, wherein the gas containing at least one of carbon dioxide ($CO_2$) and steam is top gas resulting from the process for the reduction of metal oxides.

3. The process according to claim 1, wherein the gas containing at least one of carbon dioxide ($CO_2$) and steam is export gas from a smelting reduction process or syngas from a coal gasification process.

4. The process according to claim 1, wherein carbon dioxide ($CO_2$) is produced at least from a partial quantity of the combustion off-gas which is not used for the formation of the gas mixture.

5. The process according to claim 1, wherein the gas mixture is heated before it is supplied to the fuel gas.

6. The process according to claim 1, wherein the gas containing at least one of carbon dioxide ($CO_2$) and steam is top gas from the process for the reduction of metal oxides.

7. The process according to claim 1, wherein the gas containing at least one of carbon dioxide ($CO_2$) and steam is export gas from a smelting reduction process or syngas from a coal gasification process.

8. The process according to claim 1, further comprising producing carbon dioxide ($CO_2$) at least from a partial quantity of the combustion off-gas which is not used for the formation of the gas mixture.

9. The process according to claim 1, further comprising heating the gas mixture before the gas mixture is supplied to the fuel gas.

* * * * *